United States Patent
Welton

[15] 3,670,459
[45] June 20, 1972

[54] COMBINED ABRADING, SCRAPING AND POKING IMPLEMENT

[72] Inventor: Derek Edwin Welton, Sittingbourne, England

[73] Assignee: Waso Limited, Sittingbourne, Kent, England

[22] Filed: April 2, 1971

[21] Appl. No.: 130,614

[30] Foreign Application Priority Data

April 3, 1970 Great Britain..................16,008/70

[52] U.S. Cl...................................51/181 R, 7/1 R, 15/105, 15/236 R
[51] Int. Cl..........................................B24d 15/02, B60s 1/04
[58] Field of Search..................15/104.5, 105, 218.1; 7/1 K, 7/15; 30/138; 51/181 R, 181 IN, 205, 205 WG, 214, 391, 392, 393

[56] References Cited

UNITED STATES PATENTS

| 434,705 | 8/1890 | Dickinson | 51/181 |
| 1,275,364 | 8/1918 | Bassisty | 7/15 |
| 1,898,422 | 2/1933 | Champlin | 30/138 X |
| 2,445,599 | 7/1948 | Bowen | 51/391 X |
| 3,315,295 | 4/1967 | Jeter, Jr. et al. | 15/105 |

FOREIGN PATENTS OR APPLICATIONS

| 103,975 | 8/1926 | Austria | 51/205 WG |
| 421,503 | 11/1925 | Germany | 15/105 |

*Primary Examiner*—Daniel Blum
*Attorney*—Holman & Stern

[57] ABSTRACT

The invention concerns an aid for the user of a vehicle, the aid comprising a hand tool having an abrasive surfaced channel for treating a wiper blade and further having means suitable for cleaning dirt from a washer nozzle, the means comprising a wire carried by a slider movable between an operational position where an end portion of the wire protrudes from the tool and a stowed position within the confines of the tool and vice versa.

5 Claims, 5 Drawing Figures

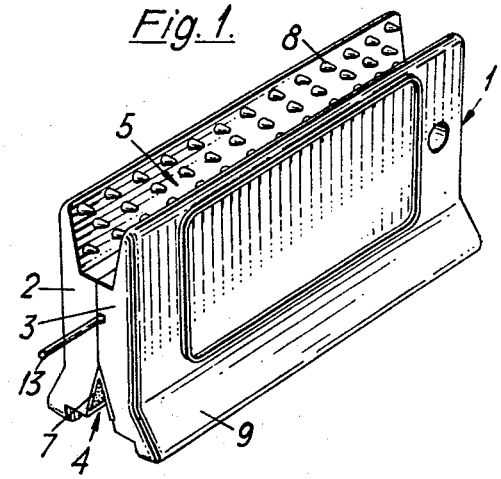
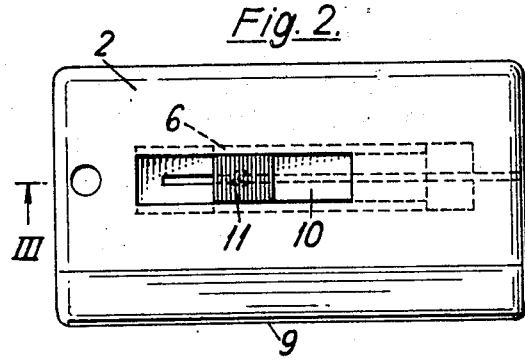
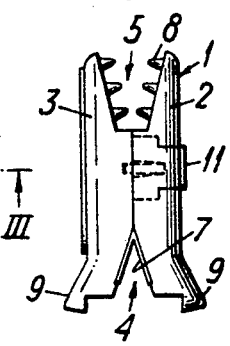
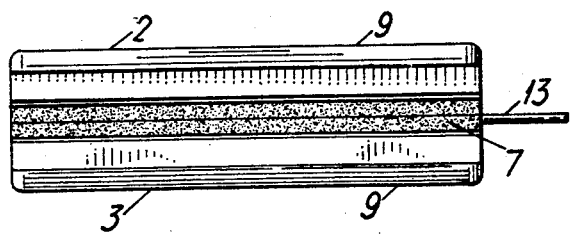
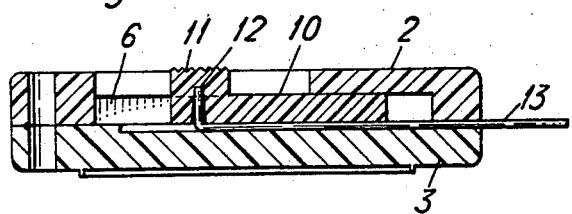

COMBINED ABRADING, SCRAPING AND POKING IMPLEMENT

This invention concerns an aid primarily for a user of a vehicle and concerns, in particular, an aid for the driver of a motor road vehicle.

The majority of motor road vehicles (as are, of course, many boats and even aircraft) are provided with arcuately sweeping windscreen wiper blades, the wiping portion of such blades being formed from a natural rubber, a synthetic rubber or a plastics material.

The wiping portions of the wiper blades tend to become hardened due to the effects of weather thereon and further because of the ever presence of dirt and grit on the windscreen, their wiping edge also becomes serrated and flawed. Because of the serrations and because of the surface hardening of the blades by the weather their performance deteriorates very rapidly.

One object of this invention is to provide a hand tool for use by a motorist or the like which may be used to enhance the performance of, and to increase the useful life of, the wiping portion of a wiper blade by reducing the particular defects aforementioned.

Most motor vehicles, especially road vehicles, are provided with one or more nozzles from which cleaning fluid from a washer mechanism is discharged onto the windscreen and in accordance with another object of this invention said hand tool is provided with means for clearing dirt from the nozzles of a windscreen washer mechanism.

According to this invention there is provided a hand tool having a body provided with a channel, such channel having at least one abrasive surface so arranged that when the wiper blade portion is placed in the channel and the hand tool is moved longitudinally of the wiping portion of the blade, said wiping portion is abraded and at least part of the hardened surface area and/or at least some of the unwanted serrations or flaws are removed and further comprising a wire coupled to a slider riding in a guideway in the body, such slider being provided to move the wire from a stored position into an operative position and vice versa.

Very conveniently two abrasive surfaces may be provided and the surface may advantageously be arranged to lie on opposite sides of the channel. Furthermore such abrasive surfaces may extend substantially the full length of the channel.

In a preferred embodiment the channel may be of substantially V-shaped cross-section.

Advantageously, the said hand tool may also be provided with one or more straight edge portions so that the tool may be used to scrape ice, frost or water from a window or other area and additionally such hand tool may be provided with a second channel, expediently substantially U-shaped or truncated V-shaped in cross-section, the side walls of such channel being provided with means for scraping ice from a windscreen wiper blade drawn through such channel. Advantageously the said means may comprise a plurality of teeth or protuberances which extend from opposite side walls of the channel so that both sides of the wiper blade may be cleared of ice simultaneously on movement of the hand tool along the blade after the latter has been located in the channel.

It will be understood that the hand tool in accordance with this invention could be provided with other items to aid the motorist and could, for example, be provided with a flexible blade so that the tool may be used as a squeegee to remove water from a window area or other surface.

However such hand tool will desirably be kept to a minimum size to aid manipulation of the same when used with a windscreen wiper blade.

In order that the invention may be more readily understood, and further features of the same more readily appreciated, one embodiment of hand tool in accordance with this invention will now be described by way of example and with reference to, the accompanying drawings in which:

FIG. 1 is a perspective view of the tool;
FIG. 2 is a front elevational view of the tool of FIG. 1;
FIG. 3 is a section on the line III—III of FIG. 2;
FIG. 4 is an end elevation of the tool; and
FIG. 5 is an underneath plan view of the tool.

In this embodiment the hand tool comprises a body 1 formed from plastics material injection mouldings 2, 3 secured to one another, the body 1 being of a generally slender rectangular form, the two opposite longitudinal side edges being provided with first and second longitudinally extending channels 4, 5, the first of these two channels designated 4 being substantially V-shaped in cross-section whilst the other second channel designated 5 is substantially U-shaped or truncated V-shaped in cross-section.

The mouldings 2, 3 forming the body 1 are of generally identical configuration secured face-to-face. The moulding 2 is provided with a guideway 6 for a slider, a portion of the guideway extending completely through the moulding 2. The moulding 3 is provided with a small groove, which when the two mouldings 2, 3 are secured to one another by means of, for example, an adhesive or by means of one or more rivets, extends parallel to the guideway 6 of the moulding 2.

The first channel 4 of V-shaped cross-section is lined with an abrasive substance and whilst such abrasive substance might be moulded with the body, very conveniently the abrasive surfaces are constituted by lining the walls of the channel 4 with a sheet of abrasive, for example, carborundum, coated paper 7.

The second channel 5 which is of said U-shaped or truncated V-shape cross-section has side walls which are each provided with a plurality of inwardly directed spaced-apart teeth or protuberances 8 for removing ice from the wiper blades.

The edge portions 9 of the body in the vicinity of the V-shaped first channel 4 are outwardly divergent and are shaped so that they may be used to scrape ice or frost from a window area or other surface. One of these edge portions 9 of the body may have a flexible edge element (not shown) so that this element may act as a squeegee for removing water from a surface.

The slider which rides in the guideway 6 is designated 10 and is formed as a further plastics material moulding and is dimensioned to be located in, and to slide along the guideway 6, the arrangement being such that the outer surface of an upstanding portion 11 thereof lies substantially flush with the outer face of the body part 2. In this way a user of the tool may readily move the slider 10 along the guideway 6. Such outer surface of the upstanding portion 11 is conveniently roughened by the formation of serrations as shown.

The surface of the slider which lies adjacent the groove is provided with a blind bore 12 extending into the upstanding portion into which a cranked end portion of an L-shaped length of spring metal wire 13 is located, the remainder of the length of the wire extending along the said groove in the second body part 3.

It will be understood that the arrangement is such that the wire 13 in the groove will move axially in response to movement of the slider 10.

Thus movement of the slider 10 along its guideway 6 in one direction will move the wire 13 into a position where its end portion extends out of the end of the groove and will protrude from the tool and will then be in an operative position whereas movement of the slider 10 in the opposite direction will result in retraction of the wire 13 into its locating groove so that such wire 13 is stored and cannot be damaged.

The preferred embodiment of tool described hereinbefore with reference to the drawings has its body moulded from a rigid plastics material and such body is dimensioned so that it is approximately two or three inches in length, one inch in breadth and one half of an inch in depth or thickness. It will be understood however, that the hand tool may be formed in a wide variety of sizes and from a wide variety of materials without departing from the scope of this invention.

Additional means (for example, a spring metal ring) may be provided to enable one or more keys to be carried by the tool so that the latter may also constitute a key fob.

The tool in accordance with this invention could also carry advertising or other indicia.

I claim:

1. A hand tool comprising:
a body;
edge portions of the body being shaped to define a channel to receive a windscreen wiper blade;
abrasive means on opposed surfaces of the channel for abrading the edge and sides of the blade;
nozzle cleaning means, said means comprising:
a stiff wire; and
a slider carrying said wire;
parts of said body being shaped to define a guideway for said wire and said slider to permit movement of said wire from a stowed position in which the wire lies within the confines of the body to an operative position where an end portion of the wire protrudes from the body.

2. A tool according to claim 1, wherein said channel is of V-shaped cross-section, said abrasive means being constituted by a sheet of abrasive material on the internal surface of such channel.

3. A tool according to claim 1, wherein said body has at least one straight edge portion suitable for removal of ice, frost or water from a window or other area.

4. A tool according to claim 1, wherein said body id shaped to define a second channel, the side walls of such second channel being provided with means for scraping ice from a windscreen wiper blade drawn through such channel.

5. A tool according to claim 4, wherein said second channel is of substantially U-shaped cross-section and said scraping means comprise a plurality of protuberances which extend from opposite side walls of the channel so that both sides of the wiper blade may be cleared of ice simultaneously on movement of the hand tool along the blade after the latter has been located in the channel.

* * * * *